(No Model.) 2 Sheets—Sheet 1.

W. R. MOORE.
AUTOMATIC BICYCLE PUMP.

No. 535,505. Patented Mar. 12, 1895.

Witnesses.
Ralph E. Bates.
Ada Bates.

Inventor.
Wm. R. Moore
By Wm. H. Bates
Attorney

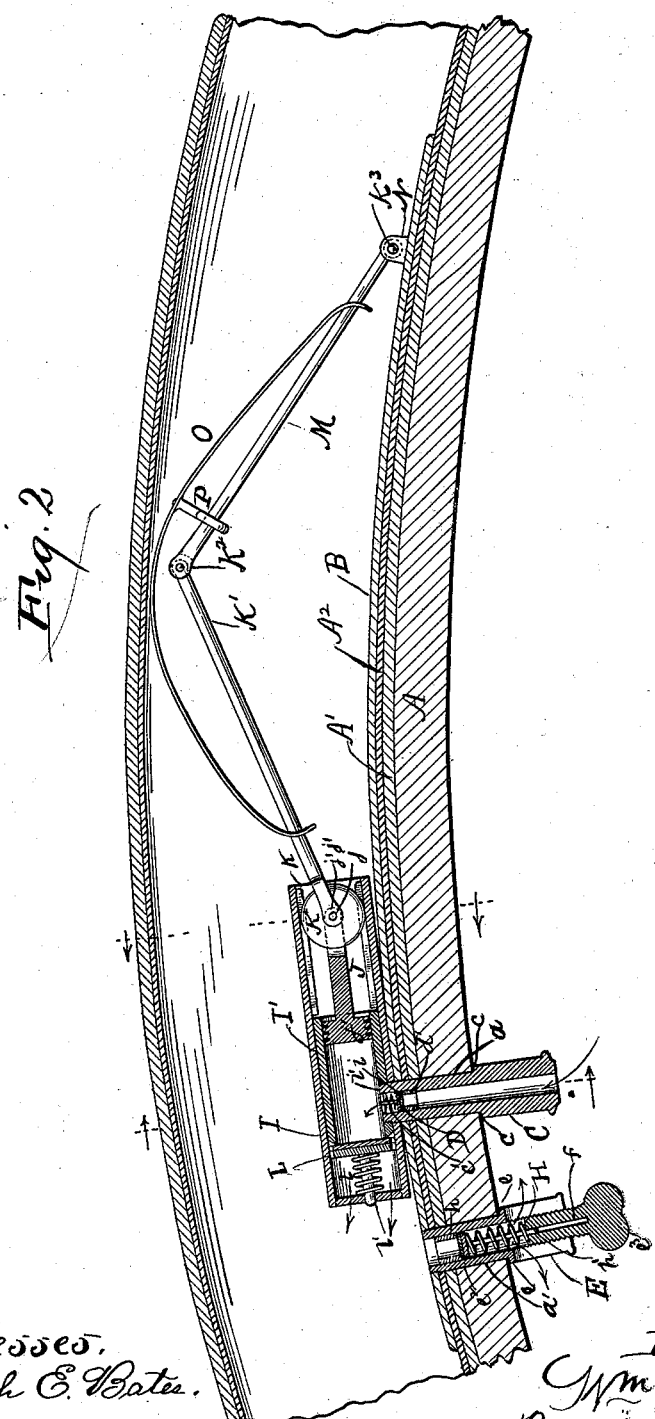

UNITED STATES PATENT OFFICE.

WILLIAM R. MOORE, OF CLEVELAND, OHIO.

AUTOMATIC BICYCLE-PUMP.

SPECIFICATION forming part of Letters Patent No. 535,505, dated March 12, 1895.

Application filed December 29, 1894. Serial No. 533,261. (No model.)

*To all whom it may concern:*

Be it known that I, WILLIAM R. MOORE, a citizen of the United States, residing at Cleveland, in the county of Cuyahoga and State of Ohio, have invented certain new and useful Improvements in Automatic Bicycle-Pumps; and I do hereby declare the following to be a full, clear, and exact description of the invention, such as will enable others skilled in the art to which it appertains to make and use the same.

My invention relates to improvements in automatic air pumps for bicycle rubber tubes and mechanism for operating said pump for inflating the tubes with air, and an air inlet valve tube, and an air escape valve tube; whereby an equal and uniform pressure of air is maintained throughout the tubes by the escape valve which regulates the pressure of the rim thereon. The object of the invention is to simplify, improve and cheapen the construction thereof.

With these ends in view the invention consists in the novel construction and combination of parts as will be hereinafter more fully in detail described and specifically pointed out in the claims.

Figure 1:
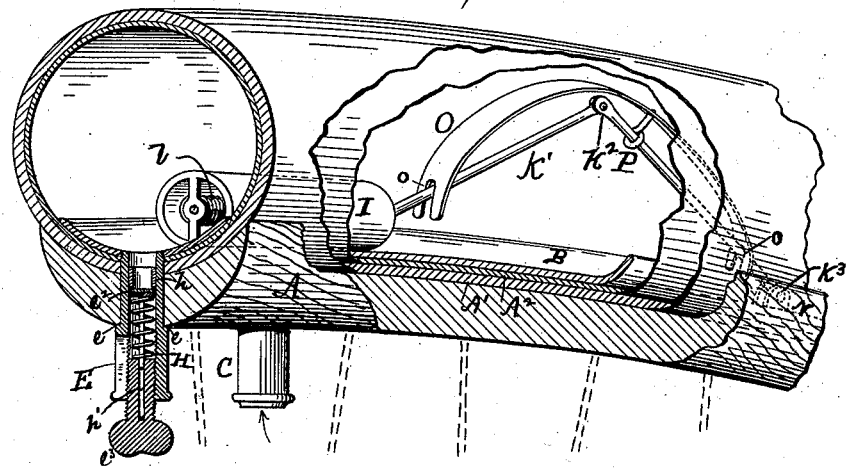
Figure 3:
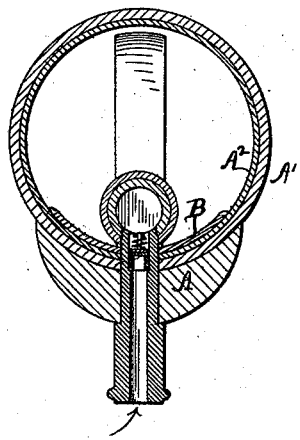
Figure 4:
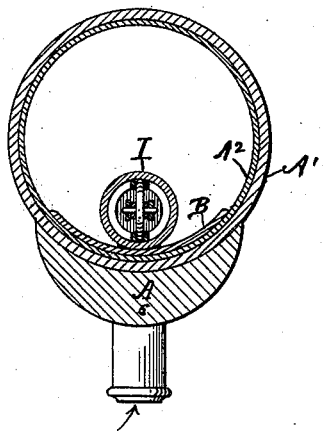

In the accompanying drawings to which reference is had and which fully illustrate my invention, Figure 1, is a perspective view of my invention the tubes being partly broken away to show my invention. Fig. 2 is a horizontal section of the same, and Figs. 3 and 4 are detail views thereof.

Similar letters of reference indicate corresponding parts in the several figures.

A, designates a concavo-convex bicycle rim, having holes or perforations $a$, $a'$, formed therethrough. Within this rim is mounted an outer rubber tube A', which is reinforced by an inner rubber air tube $A^2$ of less diameter than the former within which the air is pumped.

B, designates a concavo-convex metallic plate cemented to the inner surface of the inner rubber air tube $A^2$.

C, designates a pump cylinder air inlet valve-tube having shoulders $c$, $c$, formed thereon about midway its length which fit snugly against the under side and outer surface of the rim A. The upper portion of this tube is formed of less diameter than its lower portion, and is passed up through the hole $a$, formed in the rim A, also in the outer rubber tube A', and the inner rubber air tube $A^2$, and is passed up through and screwed to the plate B, and to an air pump or cylinder which will be hereinafter described.

D, designates the air pump or cylinder valve seated in the valve seat $d'$, formed in the upper part of the valve-tube C, and which is held in place and operated by means of a coil spring $c'$, located above the valve and valve seat $d'$, of the tube C, which is connected with and opens into an inner cylinder I' in the pump or cylinder above mentioned.

E, designates the air escape valve tube having shoulders $e$, $e$, which fit similarly to the shoulders $c$, $c$, formed on the pump or cylinder valve tube C, and up against the under side and outer surface of the rim A, the upper portion of this tube being also formed similarly to the upper portion of the pump or cylinder valve tube C, and consequently is passed upwardly through the hole $a'$, in the rim A, and through the outer tube A', and inner rubber air tube $A^2$, and through the concavo-convex plate B, where it is screwed to the plate by means of screw-threads therein and screw-threads upon the end of said tube. Within this tube is the valve seat $h$, and seated thereon is the valve $e^2$, and interposed between the valve-seat and a thumb-screw $e^3$, and passed upwardly in the lower end of the tube is a coil spring H, secured to and encircling a rod $h'$, which holds in place the valve $e^2$, the tension or pressure of which is regulated by the thumb-screw $e^3$. The upper end of this rod engages the under side of the valve-seat, the lower end being projected and playing in a slot $f$, formed in the thumb-screw. By turning the thumb-screw down the pressure of the air in the rim tubes will have to be great before the air will escape out of the valve $e^2$. The shoulders $c$, $c$, and $e$, $e$, formed upon the valve-tubes C, and E, respectively when said tubes are screwed into the plate B of the pump or cylinder draws it firmly against the rubber tubes A', $A^2$, preventing any possibility of the cement breaking loose and consequently displacement of the plate, or of the air escaping.

I, designates an air pump or cylinder inclosed in the rubber tubes A', A², and secured in a plane therewith and to the inner surface of the concavo-convex plate B, and at right angles to the depending air inlet valve-tube C, which secures it near one end of the plate B. This cylinder I, has an opening or hole $i$, in it which aligns with an opening $i'$, in another cylinder I' of less diameter and length inclosed within said cylinder I, and which is secured coincidently with I, and at right angles also to the inlet air valve-tube C, which secures the cylinders, metallic plate, rubber tubes, and rim together all of which elements have holes or perforations therein in alignment with each other for this purpose.

J, designates a piston or follower to the free end of which is secured or integrally formed a piston head J', the rear end of this piston being bifurcated for the reception of a small wheel K, having a hole centrally formed therethrough through which is passed a pivot $j$. Said pivot is also passed through holes $j'$, $j'$, formed in the bifurcated forward end of a section of a piston rod K', thus pivotally connecting the piston, its rod and small wheel together as clearly shown in Fig. 2, the holes in the forward section K', of the rod being in alignment with the hole in the wheel for the passage of the pivot of said section of rod. This wheel plays within the opening formed by the bifurcations in the piston and its rod section and traverses or reciprocates back and forth in grooves $k$, formed upon the inner surface of the cylinder I, carrying and reciprocating the piston and piston-head within the inner or smaller cylinder I', between the air inlet valve tube C, and the point where the piston head rests as clearly shown in Fig. 2 of the drawings.

L, designates a valve held in position by a coil spring $l$, coiled around a rod $l'$, which allows the air to be forced by the pump into the inner rubber air tube A², through openings formed in the end of the outer cylinder or pump, the valves D, and L opening and closing alternately as the piston plays back and forth in the pump or cylinder.

M, designates another section of the piston rod which is pivotally connected to the rear end of the first section of rod K', as at K², the rear end of this last section being pivotally connected as at K³, to a bifurcated lug N, secured to the plate B.

O, designates a curved flat spring having notches $o$, $o$, formed in the ends thereof which grasp the rod sections near their ends and having a hook P secured centrally or nearly so thereto in which the sections of the rod rest. The purpose of these rod-sections and actuating spring is to force the pump piston back and forth in the revolution of the bicycle wheel the pressure of the wheel or rim forcing the piston carrying the piston-head forwardly in the pump and the actuating spring retracting it thus operating the pump through the medium of its operating mechanism and forcing the air throughout the entire wheel uniformly and equal at all points.

From the foregoing description taken in connection with the accompanying drawings the operation of my device will be obvious and further description herein is deemed unnecessary.

Having thus described my invention, what I claim, and desire to secure by Letters Patent, is—

1. The combination with the perforated rim and perforated rubber tubes; of the perforated concavo-convex metallic plate B, secured to the inner rubber air tube, the larger cylinder or pump inclosed within said tubes and having grooves upon its inner surface at its rear end, a smaller cylinder inclosed within the larger cylinder or pump, and open at both ends within which the piston reciprocates, a valve rod and coiled spring coiled around the valve-rod, air openings in the forward end of the large cylinder or pump, piston rod having a piston head on its free end and packing around said piston-head substantially as described.

2. The combination with the large cylinder or pump having air openings in the forward end, valve, and valve-rod, coiled spring encircling said rod, and air openings in the forward end, grooves upon its inner surface at its rear end, the smaller cylinder inclosed within the former cylinder or pump, the piston having the piston head formed or secured thereon; of the small wheel pivotally secured to the bifurcated rear end of the piston and to the forward section of the piston-rod, another and rear section of the piston-rod pivotally secured at its forward end to the rear end of the forward section of the rod, the rear end of the rear section of the rod pivotally secured to the bifurcated lug secured to the concavo-convex plate, and curved actuating spring having a hook secured thereto, notches formed in each end of said spring within which the sections of the rod are clamped and actuated, substantially as described.

3. The combination with the perforated rim, and perforated rubber outer and inner tubes, concavo-convex perforated plate, larger and outer perforated cylinder or pump, smaller and inner cylinder, coiled spring, air openings in the forward end of the outer cylinder or pump, and grooves formed upon the inner surface of the rear end, rod encircled by said spring, piston and piston-head, wheel pivotally connected to the rear end of the piston and playing in the bifurcation in the rear end thereof, the forward section of the piston, bifurcated at its forward end in which the wheel plays, rear section of piston-rod pivotally secured to the rear end of the forward section of piston-rod, rear end of the rear section of piston-rod pivotally secured to the bifurcated lug secured to the concavo-convex plate actuating spring having the hook secured thereto, notches in each end thereof, clamping the piston-rod sections; of the pump or cylinder, air valve tube opening into the outer cylinder or pump and the inner cylinder of same and secured to said cylinders or pump, and having shoulders thereon and secured to the concavo-convex plate, rubber tubes, rim, air-valve, and its spring seated in the upper part of the valve-tube, substantially as described.

In testimony whereof I affix my signature in presence of two witnesses.

WM. R. MOORE.

Witnesses:
   A. A. RUTTER,
   I. A. FRANK.